United States Patent [19]

Sprafke

[11] Patent Number: 5,285,714
[45] Date of Patent: Feb. 15, 1994

[54] ROTARY-RING CARRIAGE FOR A LIGHT WEAPON ON A COMBAT VEHICLE, ESPECIALLY FOR THE HATCHWAY OF A MILITARY TANK

[75] Inventor: Uwe Sprafke, Schauenberg-Elmshagen, Fed. Rep. of Germany

[73] Assignee: Wegmann & Co. GmbH, Kassel, Fed. Rep. of Germany

[21] Appl. No.: 963,645

[22] Filed: Oct. 20, 1992

[30] Foreign Application Priority Data

Nov. 7, 1991 [DE] Fed. Rep. of Germany ........ 4136602

[51] Int. Cl.⁵ .............................................. F41A 23/24
[52] U.S. Cl. .................... 89/37.03; 89/40.03; 89/36.13
[58] Field of Search ................. 89/37.02, 37.03, 37.04, 89/37.07, 37.13, 37.11, 37.22, 40.03, 40.06, 40.16, 36.08, 36.09, 36.13, 36.16

[56] References Cited

U.S. PATENT DOCUMENTS

| | | | |
|---|---|---|---|
| 342,403 | 5/1886 | Vavasseur | 89/36.13 |
| 2,370,896 | 3/1945 | Weaver | 89/36.13 |
| 2,409,618 | 10/1946 | Evans | 89/37.03 |
| 2,642,958 | 6/1953 | Lennon | 89/37.11 |

FOREIGN PATENT DOCUMENTS

| | | | |
|---|---|---|---|
| 71716 | 6/1943 | Czechoslovakia | 89/37.02 |
| 667095 | 6/1939 | Fed. Rep. of Germany | 89/37.04 |
| 3305882 | 8/1984 | Fed. Rep. of Germany . | |
| 370397 | 4/1939 | Italy | 89/37.13 |
| 419505 | 11/1934 | United Kingdom | 89/37.03 |

*Primary Examiner*—Stephen M. Johnson
*Attorney, Agent, or Firm*—Sprung Horn Kramer & Woods

[57] ABSTRACT

A rotary-ring carriage for a light weapon on a combat vehicle, especially for the hatchway of a military tank. The weapon is mounted on an undercarriage that rolls on wheels along curved rails. The rails extend along arcs subtending angles greater than $\pi$ rad and less than $2\pi$ rad, a complete circumference. The undercarriage extends along an arc subtending an angle greater than the difference between $2\pi$ rad and the angle subtended by the rails.

5 Claims, 4 Drawing Sheets

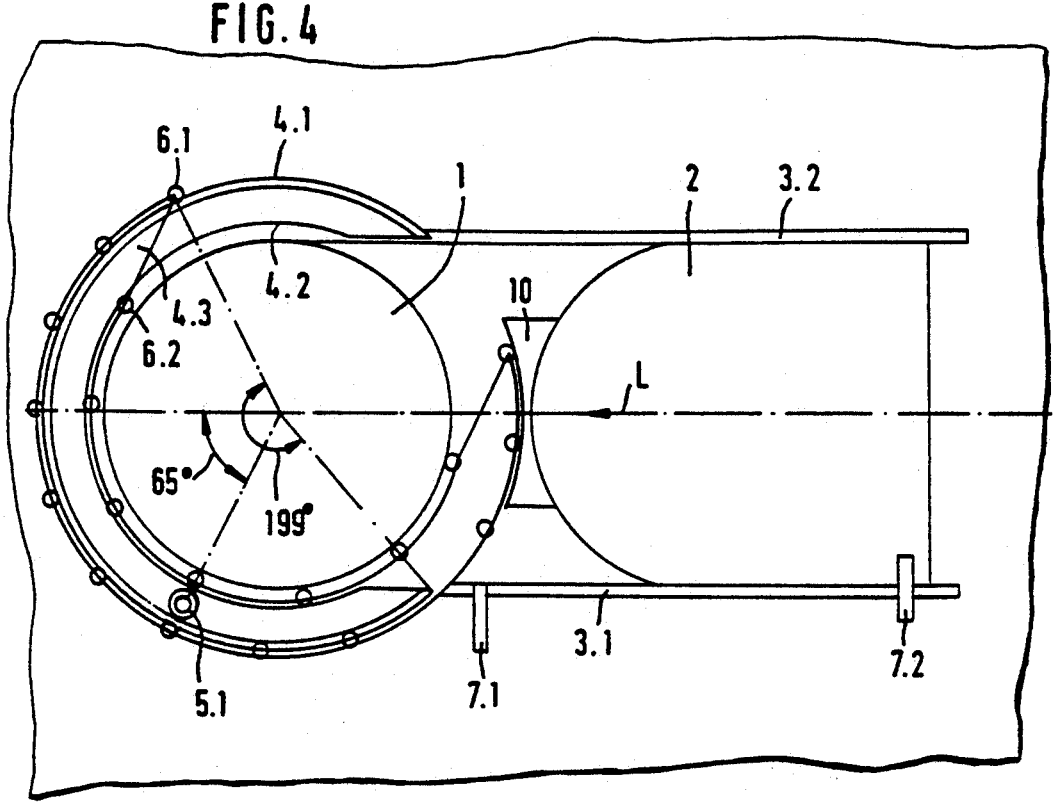
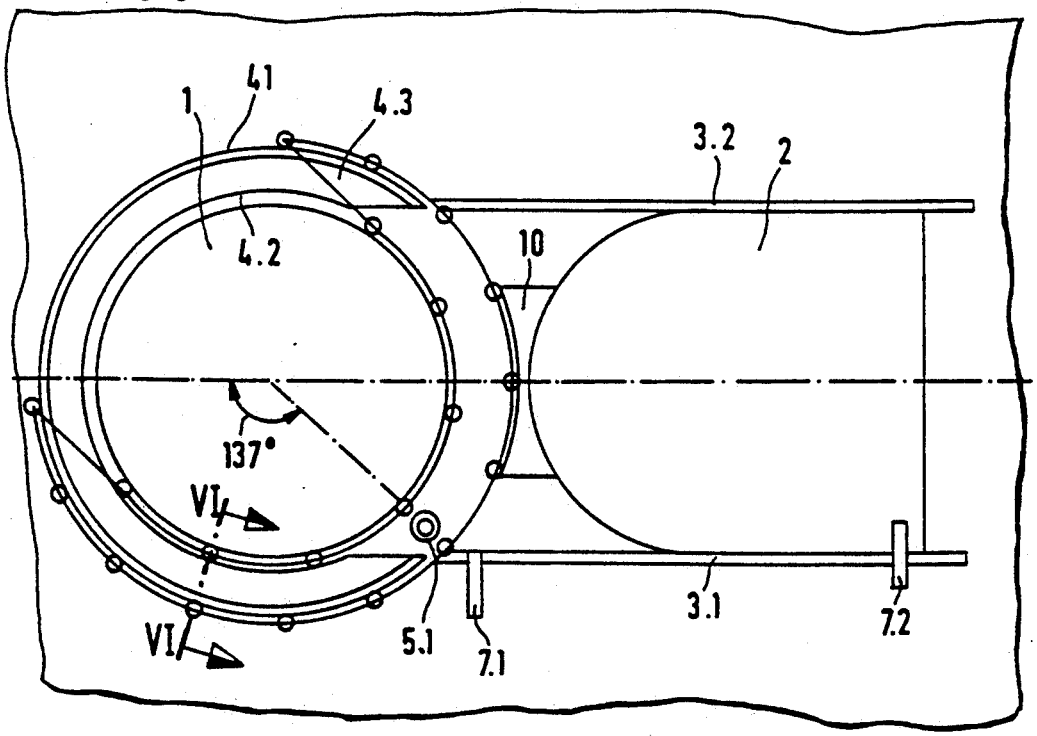

ROTARY-RING CARRIAGE FOR A LIGHT WEAPON ON A COMBAT VEHICLE, ESPECIALLY FOR THE HATCHWAY OF A MILITARY TANK

BACKGROUND OF THE INVENTION

The invention concerns a rotary-ring carriage for a light weapon on a combat vehicle, especially for hatchway of a military tank. The weapon is mounted on an undercarriage. The undercarriage rolls on wheels along curved rails.

Carriages of this type are in themselves known. The rails are continuous rings, and the undercarriage can roll unimpeded 360° and more, covering the complete azimuth. When such a carriage is mounted at a conventional hatchway, which has a folding hatch, gaps in the rails are usually filled in with sections mounted on the hatch, ensuring continuous arcs.

Military tanks are known (from German OS 3 305 882) with a hatchway at the top of the chassis or turret and with a hatch comprising two components of different mass. One is positioned above the other at least when the hatchway is closed. The upper and heavier component is positioned above the upper edge of the hatchway and slides back and forth parallel with the hatch's plane of closure. The other and lighter component can be mounted on the bottom of the upper component and move perpendicular to the plane of closure. The hatch components operate in conjunction to seal off the hatchway.

It is in some situations extremely difficult to provide such hatches with rails in the form of continuous arcs. The same problem can occur with folding hatches when they have heavy counterweights.

SUMMARY OF THE INVENTION

The object of the present invention is to improve a rotating carriage of the aforesaid type to the extent that the undercarriage can roll unimpeded without the insertion of sections to obtain continuous arcs.

This object is attained in accordance with the invention in that the rails extend along arcs longer than $\pi$ and shorter than $2\pi$, a complete circumference, and in that the undercarriage extends along an arc longer than the difference between $2\pi$ and the length of the rails.

Advantageous embodiments of the invention are recited in the subsidiary claims.

The theory of the invention is that the undercarriage extending along an arc will be long enough to span any gaps in the rails and will always have one end or the other resting on the rails even when the other end is over a gap and accordingly unsupported.

It has been demonstrated of advantage in terms of tracking and support for the undercarriage to extend along an arc approximately as long as the arcs the rails extend along. This provision will ensure that the weapon will be supported along a long enough arc.

The carriage in accordance with the invention is, as will be specified hereinafter with reference to one embodiment, of particular advantage in a military tank with a sliding hatch. Such a hatch slides back and forth precisely through the gap between the arcs of the rails. When the undercarriage of the carriage is at rest, accordingly, and spans exactly the same arc as the rails, the hatch can easily slide open between the ends of the undercarriage and of the rails.

One embodiment of the rotary-ring carriage in accordance with the invention will now be specified with reference to the drawings.

BRIEF DESCRIPTION OF THE DRAWINGS

FIG. 4 is a view similar to that in FIG. 3 with the undercarriage partly rotated.

FIG. 5 is a view similar to that in FIG. 2 with the undercarriage rotated farther.

DETAILED DESCRIPTION OF THE INVENTION

Figure 1:
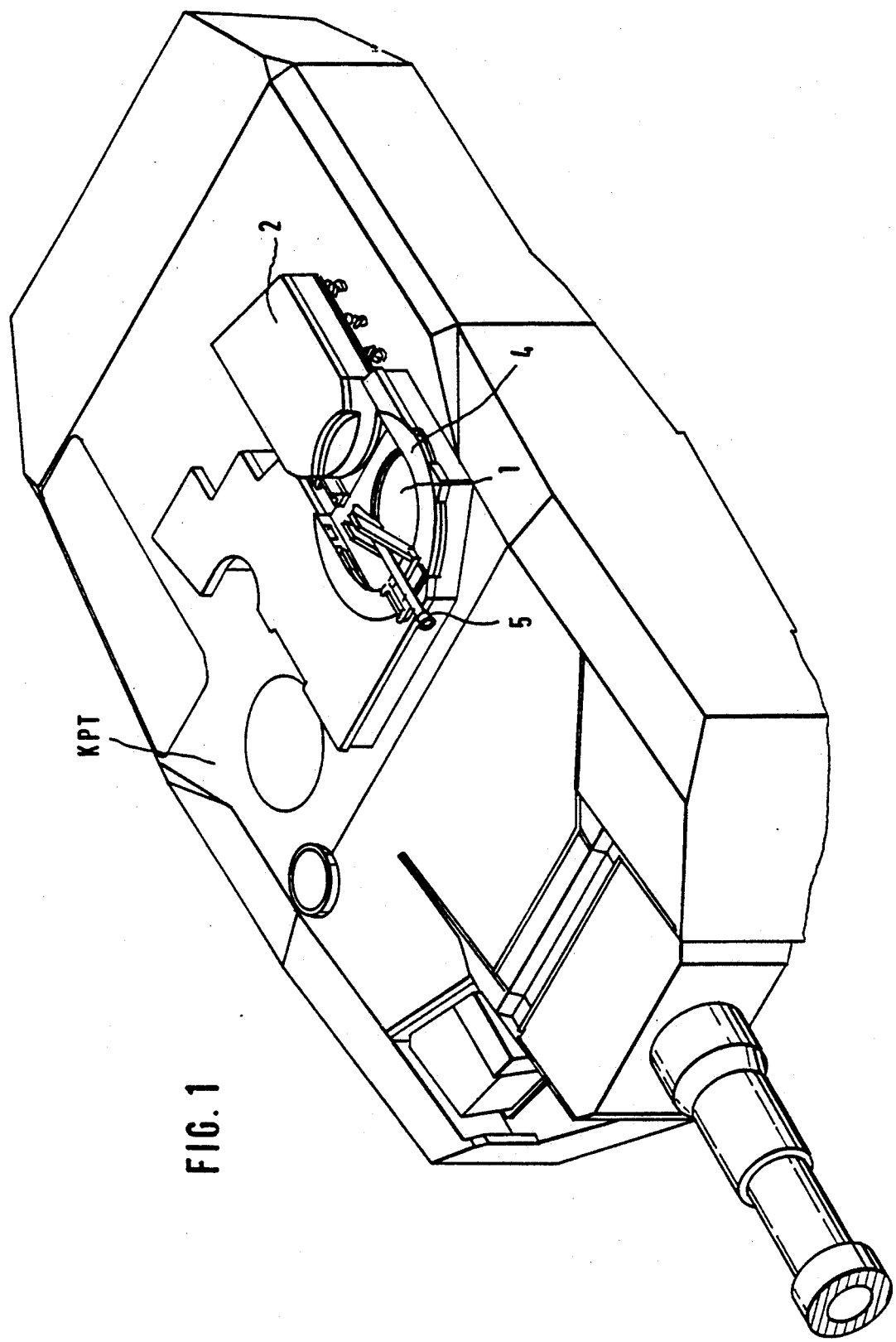
FIG. 1 is a schematic perspective view of a military-tank turret with a hatchway and sliding hatch and a rotary-ring carriage mounted on it.

FIG. 1 illustrates a military-tank turret KPT with a hatchway 1 and a sliding hatch 2. A light weapon 5 is mounted on a rotary-ring carriage 4 around the hatchway.

The design and situation of the carriage in relation to the hatch will be evident from FIGS. 2 through 6.

Figure 2:
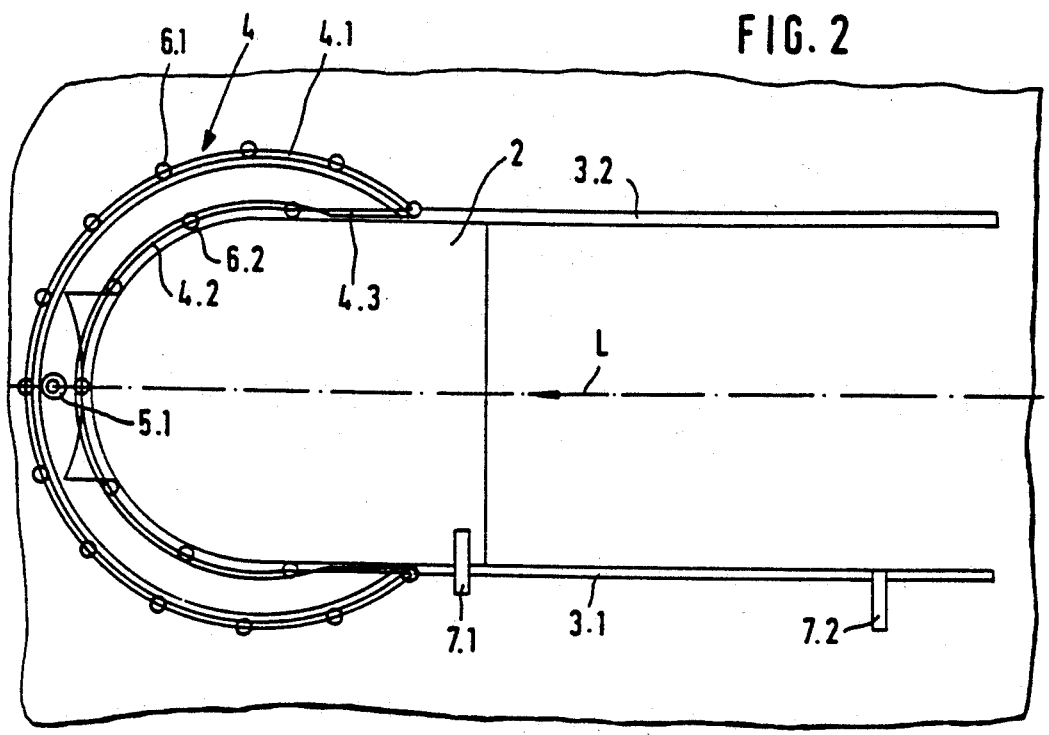
FIG. 2 is a highly schematic larger-scale top view of the hatchway with the hatch closed and locked.

The carriage and hatch are represented very schematically in FIGS. 2 through 5 to emphasize their different positions. FIG. 2 shows the hatchway closed and the hatch locked into position by a lock 7.1. Hatch 2 slides back and forth on unillustrated wheels along straight rails 3.1 and 3.2. An undercarriage 4.3 rolls on wheels 6 along curved rails 4.1 and 4.2 that extend along part of the circumference of hatchway 1. Weapon 5, represented only by its attachment 5.1, is mounted on undercarriage 4.3.

Figure 3:
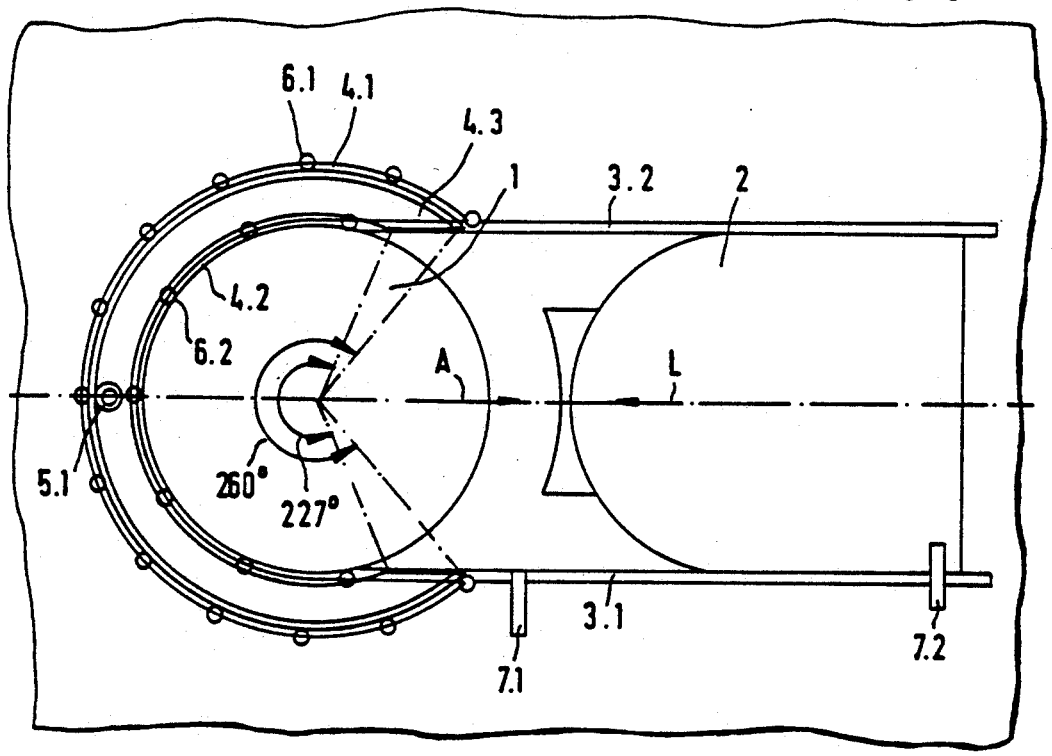
FIG. 3 is a view similar to that in FIG. 2 but with the hatch locked open and the undercarriage at rest.

Rails 4.1 and 4.2 extend along arcs of circles. The outer rail 4.1 in the illustrated embodiment extends along an arc which subtends an angle of 260° and thus has a length of $1.44\pi$ rad times the radius of rail 4.1, and the inner rail 4.2 extends along an arc which subtends an angle of 227° and thus has a length of $1.26\pi$ rad times the radius of inner rail 4.2 (FIG. 3). Undercarriage 4.3 is an annular segment with its outer edge extending approximately along the same arc as outer rail 4.1 and its inner edge along the same arc as inner rail 4.2. As will be evident from FIGS. 2 and 3, undercarriage 4.3 and curved rails 4.1 and 4.2 are approximately coincident as long as the undercarriage is at rest with weapon 5 aimed forward in the direction indicated by arrow L. Straight rails 3.1 and 3.2 extend into the space surrounded by curved rails 4.1 and 4.2 through the gap left to the rear. Hatch 2 can slide back along the straight rails opposite the direction indicated by arrow L to open the hatchway. This procedure will now be specified with reference to FIGS. 2 and 3.

Lock 7.1 is disengaged. Hatch 2 is shifted in the direction indicated by arrow A to open the hatchway 1. The hatch is locked into position with another lock 7.2. There is now a gap between the ends of curved rails 4.1 and 4.2, and undercarriage 4.3 can be rotated. FIG. 4 illustrates it rotated out of its rest position to an angle of approximately 65° of azimuth. Approximately ⅔ of the length of undercarriage 4.3 now rests on the curved rails. The remaining ¼ extends over the gap between the ends of the rails.

Assume that undercarriage 4.3 is rotated farther into the position illustrated in FIG. 5, at an angle of approximately 137° of azimuth out of its rest position. Although only approximately ½ of its length will now be supported, its other end will already have moved beyond the gap and will be resting on the rails on the other side. It will accordingly be correctly positioned and supported.

As undercarriage 4.3 rotates farther, the supported section at the bottom in FIG. 5 will decrease and the supported section at the top will increase. At least half the length of the undercarriage will accordingly always be supported. This length corresponds to the prescribed length of the undercarriage and curved rails at which the gap between the ends of outer rail 4.1 precisely subtends an angle of $0.56\pi$ rad or 100°. Thus, even in the worst possible case, the undercarriage will always be supported at its outer edge over a total angle of 160°.

Mounted at the front of hatch 2 is a guide 10 that laterally supports the ends of the undercarriage while the hatchway is open and the undercarriage is rotated.

Figure 6:
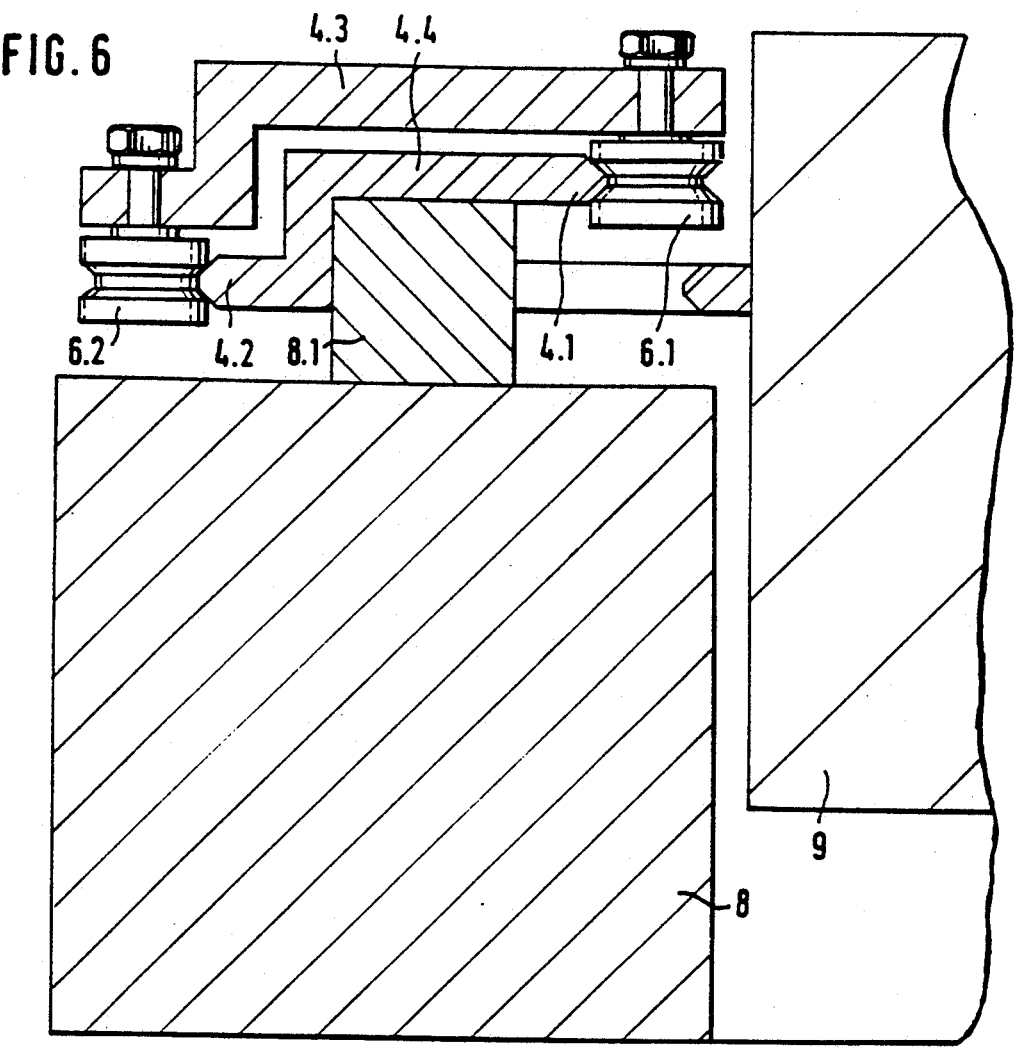
FIG. 6 is a still larger-scale vertical cross-section along the line VI—VI in FIG. 5.

FIG. 6 is a detail illustrating how the undercarriage rests on the rails. Curved rails 4.1 and 4.2 are positioned on different levels at the edges of a recessed ring 4.4. Ring 4.4 is mounted on an annular spacer 8.1 on a supporting ring 8 secured to the roof of the turret. Recessed ring 4.4, annular spacer 8.1, and supporting ring 8 are surrounded by an annular adaptor 9. Distributed along the outer edge of undercarriage 4.3 are wheels 6.1. Wheels 6.1 rotate around axes perpendicular to the plane of the rotary ring. Distributed around the inner edge of undercarriage 4.3 are wheels 6.2 that also rotate around axes perpendicular to the same plane. There are wedge-shaped notches or grooves along the circumference of wheels 6.1 and 6.2. The notches or grooves are engaged by the matching edges of curved rails 4.1 and 4.2. This design ensures satisfactory accommodation of vertical stress and a smooth circular motion.

Figure 7:
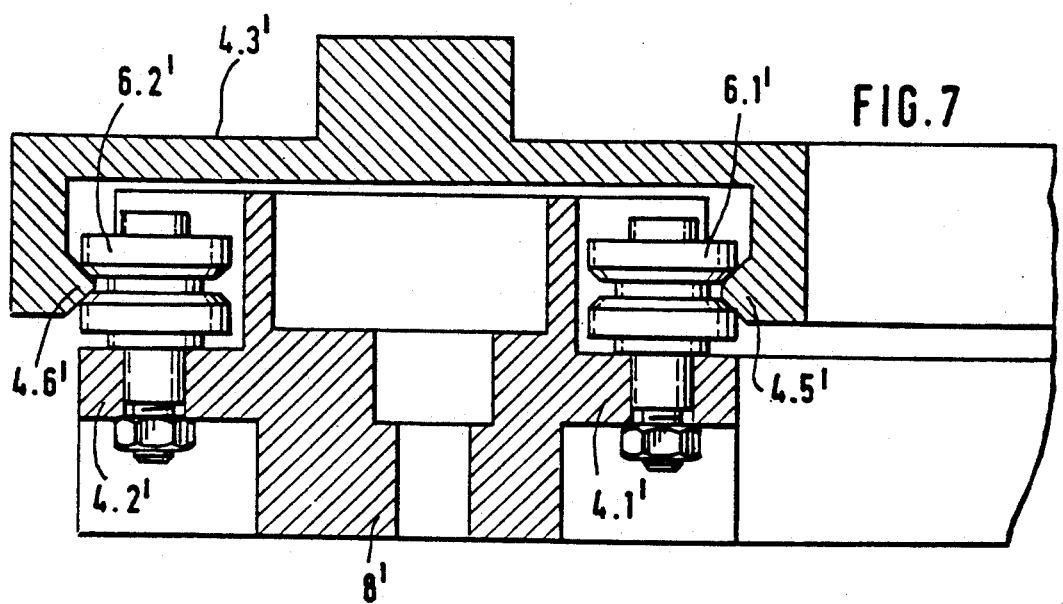
FIG. 7 is a view similar to that in FIG. 6 of a different version of the undercarriage and rails.

The wheels in the embodiment illustrated in FIGS. 2 through 6 are on the undercarriage. They can of course just as well be mounted on the rails, in which case corresponding rails on the undercarriage will engage the wheels. This version is illustrated in FIG. 7.

Curved rails 4.1' and 4.2' are mounted on a supporting ring 8' secured in an unillustrated way to the roof of the turret. Wheels 6.1' and 6.2' are mounted on curved rails 4.1' and 4.2'. Matching rails 4.5' and 4.6' are mounted on undercarriage 4.3' and engage the wheels. Otherwise the design and operation of this version are like those of the embodiment illustrated in FIGS. 2 through 6.

What is claimed is:

1. A rotary-ring carriage for a light weapon on a combat vehicle, comprising: curved rails, an undercarriage having wheels which roll along the curved rails and on which a weapon is mountable, wherein the rails extend along arcs which subtend an angle greater than $\pi$ rad and less than $2\pi$ rad corresponding to a complete circumference, and wherein the undercarriage extends along an arc which subtends an angle greater than the difference between $2\pi$ rad and the angle subtended by the rails.

2. The carriage as in claim 1, wherein the undercarriage extends along an arc subtending an angle approximately as great as the arcs of the curved rails.

3. The carriage as in claim 2, wherein the undercarriage and the curved rails extend along arcs subtending angles of essentially $5/4\pi$ to $3/2\pi$ rad.

4. The carriage as in claim 1, wherein the wheels of the undercarriage are distributed along an inner edge and an outer edge in a plane and rotate on axes perpendicular to the plane, wherein each said wheel has a wedge-shaped groove therearound and wherein the rails have corresponding curved tracks paralleling the plane and engaging the grooves.

5. The carriage as in claim 1, for an entrance-and-exit hatchway of a military tank with a hatch that closes the hatchway, wherein the hatch has a component for sliding back and forth above an upper edge of the hatchway along an axis paralleling a plane of closure of the hatchway, wherein the curved rails are positioned symmetrical with respect to the axis along which component slides, and wherein the component slides back and forth through a gap between ends of the arcs.

* * * * *